US 11,467,728 B2

(12) United States Patent
Paik et al.

(10) Patent No.: US 11,467,728 B2
(45) Date of Patent: Oct. 11, 2022

(54) STORAGE DEVICE USING NEURAL NETWORK AND OPERATING METHOD FOR AUTOMATIC REDISTRIBUTION OF INFORMATION AND VARIABLE STORAGE CAPACITY BASED ON ACCURACY-STORAGE CAPACITY TRADEOFF THEREOF

(71) Applicant: Korea Advanced Institute of Science and Technology, Daejeon (KR)

(72) Inventors: Se-Bum Paik, Daejeon (KR); Hyeonsu Lee, Daejeon (KR); Youngjin Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 507 days.

(21) Appl. No.: 16/674,919

(22) Filed: Nov. 5, 2019

(65) Prior Publication Data

US 2020/0326852 A1    Oct. 15, 2020

(30) Foreign Application Priority Data

Apr. 15, 2019    (KR) .................. 10-2019-0043444

(51) Int. Cl.
*G06F 3/06* (2006.01)
*G06N 3/08* (2006.01)
*G06N 3/04* (2006.01)

(52) U.S. Cl.
CPC .......... *G06F 3/0604* (2013.01); *G06F 3/0638* (2013.01); *G06F 3/0673* (2013.01); *G06N 3/049* (2013.01); *G06N 3/08* (2013.01)

(58) Field of Classification Search
None
See application file for complete search history.

(56) References Cited

U.S. PATENT DOCUMENTS

2015/0278683 A1 * 10/2015 Gupta ................. G06N 3/08
706/25

FOREIGN PATENT DOCUMENTS

JP          101594724        2/2016
JP        1020160138125     12/2016

OTHER PUBLICATIONS

Lee et al., "Distinct role of flexible and stable according in sequential working memory", bioRxiv, Jan. 20, 2019, pp. 1-38.

* cited by examiner

*Primary Examiner* — Charles J Choi
(74) *Attorney, Agent, or Firm* — Blank Rome LLP

(57) ABSTRACT

Provided are a storage device using a neural network and an operating method of the storage device for automatic redistribution of information and variable storage capacity based on accuracy-storage capacity tradeoff that may learn input information using the neural network and may store the learned information. The neural network may include a plurality of input neurons and a plurality of output neurons; at least one stable synapse configured to connect at least one of the input neurons and at least one of the output neurons, respectively; and at least one flexible synapse configured to connect at least one remaining of the input neurons and at least one remaining of the output neurons, respectively.

20 Claims, 13 Drawing Sheets

STORAGE DEVICE USING NEURAL NETWORK AND OPERATING METHOD FOR AUTOMATIC REDISTRIBUTION OF INFORMATION AND VARIABLE STORAGE CAPACITY BASED ON ACCURACY-STORAGE CAPACITY TRADEOFF THEREOF

CROSS-REFERENCE TO RELATED APPLICATION

This application claims the priority benefit of Korean Patent Application No. 10-2019-0043444, filed on Apr. 15, 2019, in the Korean Intellectual Property Office, the disclosure of which is incorporated herein by reference.

BACKGROUND

Field of the Invention

The following description of example embodiments relates to a storage device using a neural network and an operating method of the storage device for automatic redistribution of information and variable storage capacity based on accuracy-storage capacity tradeoff. This work was supported by the National Research Foundation of Korea (NRF) grant funded by the Korea government (MSIT) (No. NRF-2016R1C1B2016039, NRF-2017R1E1A2A02080940, NRF-2019R1A2C4069863, NRF-2019M3E5D2A01058328).

Description of the Related Art

In general, a storage device is widely used as technology for learning and storing information using a neural network. The technology is useful when an amount of information input to the storage device is less than storage capacity of the storage device. That is, if an amount of information input to the storage device is greater than the storage capacity of the storage device, various types of issues may occur in the storage device. For example, the storage device does not learn input information or needs to delete prestored, that is, old information to learn the input information.

To outperform the aforementioned issues, a change in a physical structure of the storage device may be considered. That is, a size of the neural network may be increased in the storage device. Alternatively, an external memory distinguished from the neural network may be added to the storage device. Through this, the storage capacity of the storage device may increase. However, if an amount of information input to the storage device is greater than the storage capacity of the storage device, the aforementioned issues may arise.

SUMMARY

Example embodiments provide a storage device that may efficiently use a storage capacity of a storage device without changing a physical structure of the storage device and an operating method thereof.

Example embodiments also provide a storage device that may maintain old information and, simultaneously, learn input information although an amount of information input to the storage device exceeds the storage capacity of the storage device.

According to an aspect of example embodiments, there is provided a storage device configured to implement automatic redistribution of information and variable storage capacity of the storage device based on accuracy-storage capacity tradeoff, the storage device including a memory; and a processor connected to the memory, and configured to learn input information using a neural network and to store the learned information in the memory.

The neural network includes a plurality of input neurons and a plurality of output neurons; at least one stable synapse configured to connect at least one of the input neurons and at least one of the output neurons, respectively; and at least one flexible synapse configured to connect at least one remaining of the input neurons and at least one remaining of the output neurons, respectively.

According to an aspect of example embodiments, there is provided an operating method of a storage device configured to implement automatic redistribution of information and variable storage capacity of the storage device based on accuracy-storage capacity tradeoff, the method including detecting input information; learning the detected information using a neural network; and storing the learned information.

The neural network includes a plurality of input neurons and a plurality of output neurons; at least one stable synapse configured to connect at least one of the input neurons and at least one of the output neurons, respectively; and at least one flexible synapse configured to connect at least one remaining of the input neurons and at least one remaining of the output neurons, respectively.

According to an aspect of example embodiments, there is provided a storage device configured to implement automatic redistribution of information and variable storage capacity of the storage device based on accuracy-storage capacity tradeoff, and storing one or more programs to perform an operation of detecting input information, an operation of learning the detected information using a neural network, and an operation of storing the learned information, The neural network includes a plurality of input neurons and a plurality of output neurons; at least one stable synapse configured to connect at least one of the input neurons and at least one of the output neurons, respectively; and at least one flexible synapse configured to connect at least one remaining of the input neurons and at least one remaining of the output neurons, respectively.

According to some example embodiments, a storage device may efficiently use a storage capacity. That is, the storage device may flexibly use the storage capacity without changing a physical structure. The storage device may maintain prestored, that is, old information by redistributing and altering the old information using a neural network. Accordingly, the storage device may maintain the prestored information and may learn the input information although an amount of the input information exceeds the storage capacity of the storage device. That is, accuracy-storage capacity tradeoff may be realized in the storage device, Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
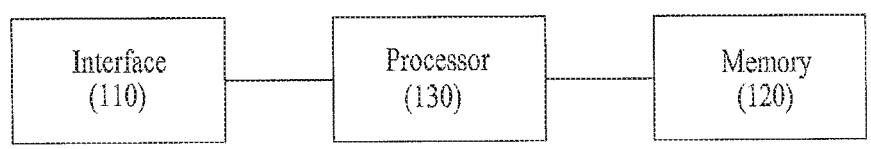
FIG. 1 illustrates an example of a storage device according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described with reference to the accompanying drawings.

According to example embodiments, a storage device may effectively process information using a neural network. For example, the storage device may store, alter, or delete the information. The storage device may learn input information and may store the learned information. Here, although an amount of information input to the storage device exceeds the storage capacity of the storage device, the storage device may maintain prestored information (hereinafter, also referred to as old information) and may also learn the input information. To this end, the storage device may maintain the old information by redistributing and altering the old information using a neural network.

Figure 2:
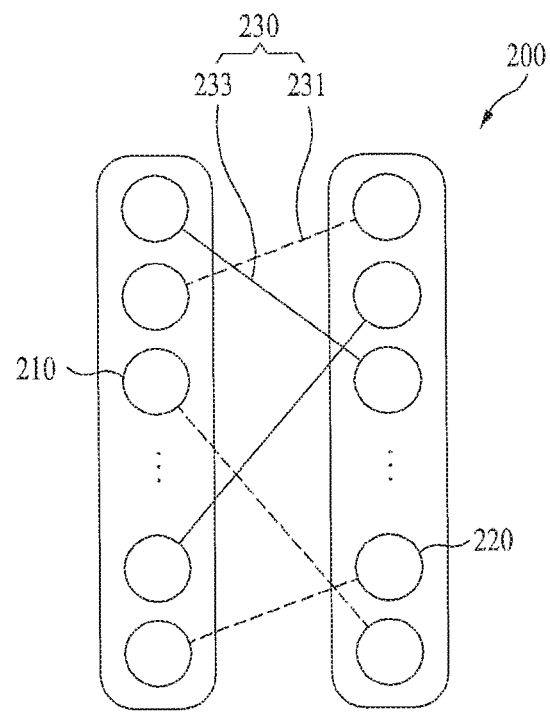
FIG. 2 illustrates an example of a neural network used in a storage device according to at least one example embodiment.
Figure 3:
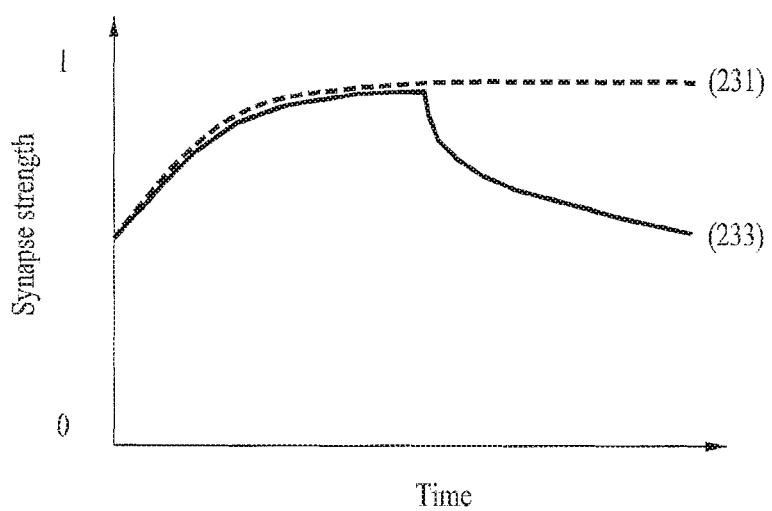
FIG. 3 is a graph showing characteristics of stable synapses and flexible synapses of FIG. 2 according to at least one example embodiment.
Figure 4A:
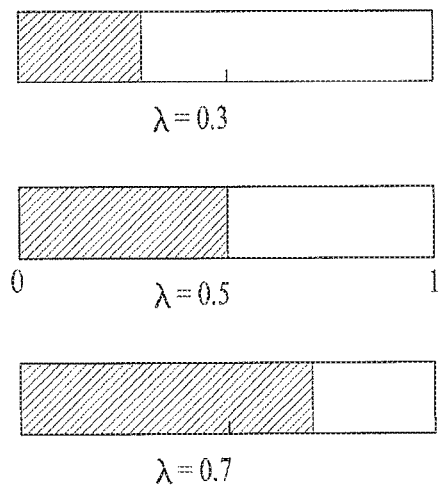
FIGS. 4A and 4B illustrate examples for describing a characteristic of a storage device according to at least one example embodiment.
Figure 4B:
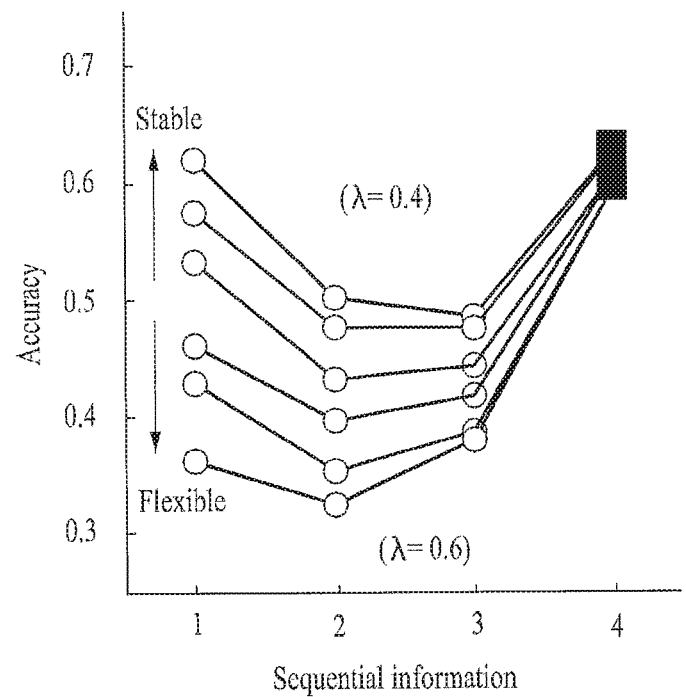

FIG. 1 illustrates an example of a storage device 100 according to at least one example embodiment, FIG. 2 illustrates an example of a neural network 200 used in the storage device 100 according to at least one example embodiment, FIG. 3 is a graph showing characteristics of stable synapses 231 and flexible synapses 233 of FIG. 2 according to at least one example embodiment, and FIGS. 4A and 4B illustrate examples for describing a characteristic of the storage device 100 according to at least one example embodiment.

Referring to FIG. 1, the storage device 100 according to example embodiments may include at least one of an interface 110, a memory 120, and a processor 130. Depending on example embodiments, at least one of the components of the storage device 100 may be omitted, or at least one another component may be added to the storage device 100.

The interface 110 may be provided for direct connection or wireless connection between the storage device 100 and an external device (not shown). The interface 110 may support at least one protocol. For example, the interface 110 may include at least one of a high definition multimedia interface (HDMI), a universal, serial bus (USB) interface, a secure digital (SD) card interface, and an audio interface.

The memory 120 may store a variety of data used by at least one component of the storage device 100. The data may include input data or output data for at least one program and an instruction associated therewith. For example, the memory 120 may include at least one of a volatile memory and a nonvolatile memory.

The processor 130 may control at least one of the components of the storage device 100 by executing a program of the memory 120 and may perform data processing or operation. The processor 130 may detect information input through the interface 110. The processor 130 may learn input information using the neural network 200 and may store the learned information in the memory 120. According to at least one example embodiment, the processor 130 may redistribute information prestored in the memory 120 using the neural network 200, while learning the input information. Here, the processor 130 may automatically redistribute the information prestored in the memory 120 based on an amount of the input information. Accordingly, although a large amount of information is input, the processor 130 may increase an amount of information stored in the memory 120 by minimally sacrificing accuracy of information stored in the memory 120 based on the prestored information and the input information. Accordingly, accuracy-storage capacity tradeoff may be realized in the storage device 100.

According to example embodiments, referring to FIG. 2, the neural network 200 may include a plurality of input neurons 210, a plurality of output neurons 220, and a plurality of synapses 230. The input neurons 210 and the output neurons 220 may correspond to each other. The synapses 230 may connect the input neurons 210 and the output neurons 220, respectively. Accordingly, input information may be input through each input neuron 210, converted based on a synaptic strength of each synapse 230, and output through each output neuron 220. Here, the synaptic strength may be determined as a single value between 0 and 1 and may be represented as a weight.

According to example embodiments, the neural network 200 may be configured to realize accuracy-storage capacity tradeoff. To this end, the synapses 230 may include at least one stable synapse 231 and at least one flexible synapse 233. Here, the stable synapse 231 and the flexible synapse 233 may have characteristics shown in the graph of FIG. 3. The synaptic strength of the stable synapse 231 may be fixed at a predetermined strength and thus, the stable synapse 231 may be maintained without changing old information based on input information. For example, if the synaptic strength of the stable synapse 231 is less than the predetermined strength, the synaptic strength of the stable synapse 231 may be adjusted. Here, the synaptic strength of the stable synapse 231 may be strengthened, for example, increase. If the synaptic strength of the stable synapse 231 reaches the predetermined strength, the synaptic strength of the stable synapse 231 may be maintained without being further adjusted. The synaptic strength of the flexible synapse 233 may be continuously adjusted without being fixed. Accordingly, the flexible synapse 233 enables input information to be continuously learned. For example, the synaptic strength of the flexible synapse 233 may be strengthened or weakened, for example, increase or decrease.

Therefore, the processor 130 may adjust at least one of the synaptic strength of stable synapse 231 and the synaptic strength of the flexible synapse 233 using the neural network 200 while learning the input information. Here, if the synaptic strength of the stable synapse 231 is a predetermined strength, the processor 130 may maintain the synaptic strength of the stable synapse 231 and may adjust the synaptic strength of the flexible synapse 233. For example, the processor 130 may strengthen or weaken, for example, increase or decrease the synaptic strength of the flexible synapse 233 between 0 and 1. In contrast, if the synaptic strength of the stable synapse 231 is not reached to the predetermined strength, the processor 130 may adjust the synaptic strength of stable synapse 231 and the synaptic strength of the flexible synapse 233. For example, the processor 130 may strengthen, for example, increase the synaptic strength of stable synapse 231 between 0 and 1, and may strengthen or weaken, for example, increase or decrease the synaptic strength of the flexible synapse 233 between 0 and 1.

According to example embodiments, a characteristic of the storage device 100 may be determined based on ratios of the stable synapses 231 and the flexible synapses 233 among the synapses 230. Stability represents a characteristic of maintaining old information and flexibility represents a characteristic of learning input information. Here, according to an increase in the stability of the storage device 100, the accuracy of information stored in the storage device 100 may increase based on the old information and the input information. If a ratio of the stable synapses 231 is greater than a ratio λ of the flexible synapse 233 among the synapses 230, the stability may be higher than the flexibility in the storage device 100. Here, according to an increase in the ratio of the stable synapse 231 among the synapses 230, the stability of the neural network 200 may increase. If the ratio λ of the flexible synapse 233 is greater than the ratio of the stable synapse 231 among the synapses 230, the flexibility may be higher than the stability in the storage device 100. Referring to FIG. 4A, the ratio λ of the flexible synapses 233 among the synapses 230 may be determined as a single value between 0 and 1. Here, referring to FIG. 4B, if the ratio of the flexible synapses 231 among the synapses 230 increases, the flexibility of the neural network 200 may be improved.

According to an example embodiment, the neural network 200 may include a feedforward spiking neural network. The feedforward spiking neural network may be configured using a leaky-integrate-and-fire (LIF) model that simulates a biological characteristic of actual neuron. In the feedforward spiking neural network, the synaptic strength of the synapses 230 may be adjusted based on a spike-timing-dependent plasticity (STDP) learning rule. The LIF model may be represented as the following Equation 1 and Equation 2. The STDP learning rule may be represented as the following Equation 3 and Equation 4.

$$C\frac{dV_j(t)}{dt} = g_L(E_L - V_j(t)) + g_j(t)(E_{syn} - V_j(t)) + I_{noise} \quad \text{[Equation 1]}$$

In Equation 1, $V_j$ denotes a membrane potential, C denotes a cell membrane capacitance, denotes a membrane conductance, $E_L$ denotes a resting potential, $E_{syn}$ denotes a reversal potential, and $g_j$ denotes a voltage-dependent channel conductance and may be represented as the following Equation 2.

$$\frac{dg_j(t)}{dt} = -\frac{g_j(t)}{\tau_{syn}} + c_{syn}\sum_i w_{ij}S_i(t) \quad \text{[Equation 2]}$$

In Equation 2, $S_i$ denotes spikes fired by the input neurons 210, $w_{ij}$ denotes the synaptic strength of the synapses 230, and $c_{syn}$ denotes magnitude of excitatory postsynaptic conductance (EPSC) of the output neurons 220 induced by spikes. If the membrane potential $V_j$ exceeds a specific limit point, for example, 55 mV, action potential occurs, which causes the output neurons 220 to fire and the membrane potential $V_j$ may return to the resting potential $E_L$.

$$\Delta w_{ij} = \begin{cases} k_+(w_{max} - w_{ij})e^{-\frac{\Delta t}{\tau_+}} & \Delta t \geq 0, \text{ LTP} \\ k_-(w_{ij} - w_{min})e^{-\frac{\Delta t}{\tau_-}} & \Delta t < 0, \text{ LTD} \end{cases} \quad \text{[Equation 3]}$$

Here, if the synaptic strength of the stable synapse 231 reaches a predetermined strength, for example, 1% difference between a maximum value and a minimum value, the synaptic strength is not adjusted anymore and may be represented as the following Equation 4.

$$\Delta w_{ij} = 0 \quad \begin{cases} w > (1-\alpha)\cdot w_{max} + \alpha \cdot w_{min}, & \text{LTP} \\ w < \alpha \cdot w_{max} + (1-\alpha)\cdot w_{min}, & \text{LTD} \end{cases} \quad \text{[Equation 4]}$$

In Equation 4, α may be determined as a value between 0 and 1.

The storage device 100 according to example embodiments is configured to implement automatic redistribution of information and variable storage capacity based on accuracy-storage capacity tradeoff and may store one or more programs configured to perform an operation of detecting input information, an operation of learning the detected information using a neural network, and an operation of storing the learned information.

The storage device 100 according to example embodiments may include the memory 120, and the processor 130 connected to the memory 120, and configured to learn input information using the neural network 200 and to store the learned information in the memory 120.

According to example embodiments, the neural network 200 may include the plurality of input neurons 210, the plurality of output neurons 220, and at least one stable synapse 231 configured to connect at least one of the input neurons 210 and at least one of the output neurons 220, respectively, and at least one flexible synapse 233 configured to connect at least one remaining of the input neurons 210 and at least one remaining of the output neurons 220, respectively.

According to example embodiments, the processor 130 may be configured to redistribute information prestored in the memory 120 using the neural network 200 while learning input information.

According to example embodiments, the processor 130 may be configured to automatically redistribute old information based on an amount of input information.

According to example embodiments, the processor 130 may be configured to adjust at least one of the synaptic strength of the stable synapse 231 and the synaptic strength of the flexible synapse 233 while learning input information.

According to example embodiments, the processor 130 may be configured to maintain the synaptic strength of the stable synapse 231 and to adjust the synaptic strength of the flexible synapse 233 if the synaptic strength of the stable synapse 231 is a predetermined strength.

According to example embodiments, the processor 130 may be configured to adjust the synaptic strength of the stable synapse 231 and the synaptic strength of the flexible synapse 233 if the synaptic strength of the stable synapse 231 is not reached to a predetermined maximum or minimum strength.

According to example embodiments, the neural network 200 may include a feedforward spiking neural network.

According to example embodiments, the processor 130 may be configured to convert input information to at least one temporal pattern in a spike form and to learn the temporal pattern using the feedforward spiking neural network.

According to example embodiments, the processor 130 may be configured to adjust at least one of the synaptic strength of the stable synapse 231 and the synaptic strength of the flexible synapse 233 based on an STDP learning rule.

According to example embodiments, the storage device 100 may efficiently use a storage capacity. That is, the storage device 100 may flexibly use the storage capacity without changing a physical structure. The storage device 100 may maintain prestored, that is, old information by redistributing and altering the old information using the neural network 200. Accordingly, the storage device 100 may maintain the old information and may learn the input information although an amount of the input information exceeds the storage capacity of the storage device 100. That is, the accuracy-storage capacity tradeoff may be realized in the storage device 100.

Figure 5:
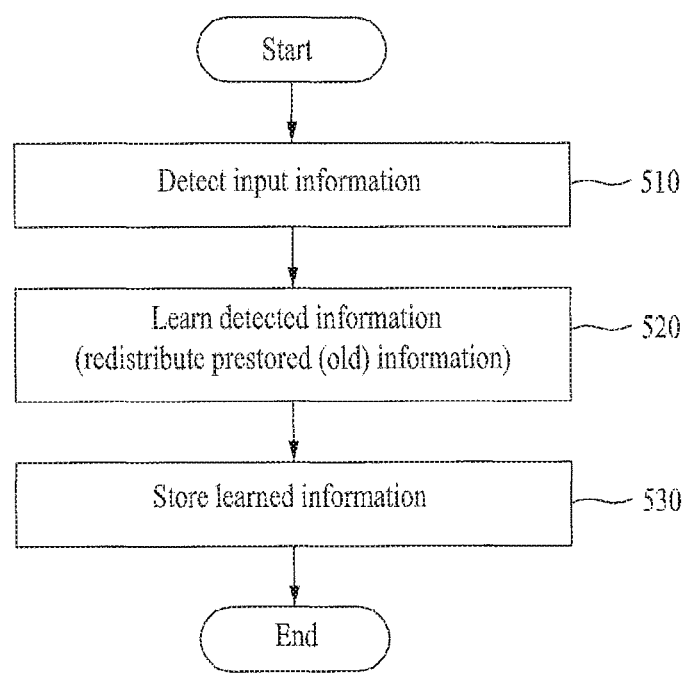
FIG. 5 is a flowchart illustrating an example of an operating method of a storage device according to at least one example embodiment.
Figure 6:
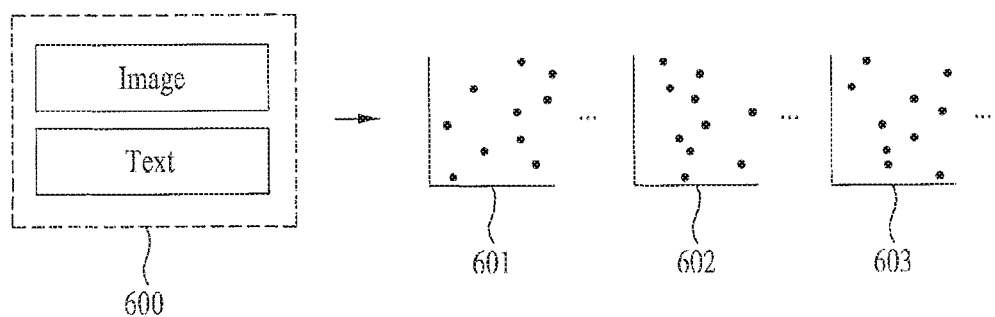
FIGS. 6, 7, and 8 illustrate examples of an operation of learning detected information of FIG. 5 according to at least one example embodiment.
Figure 7:
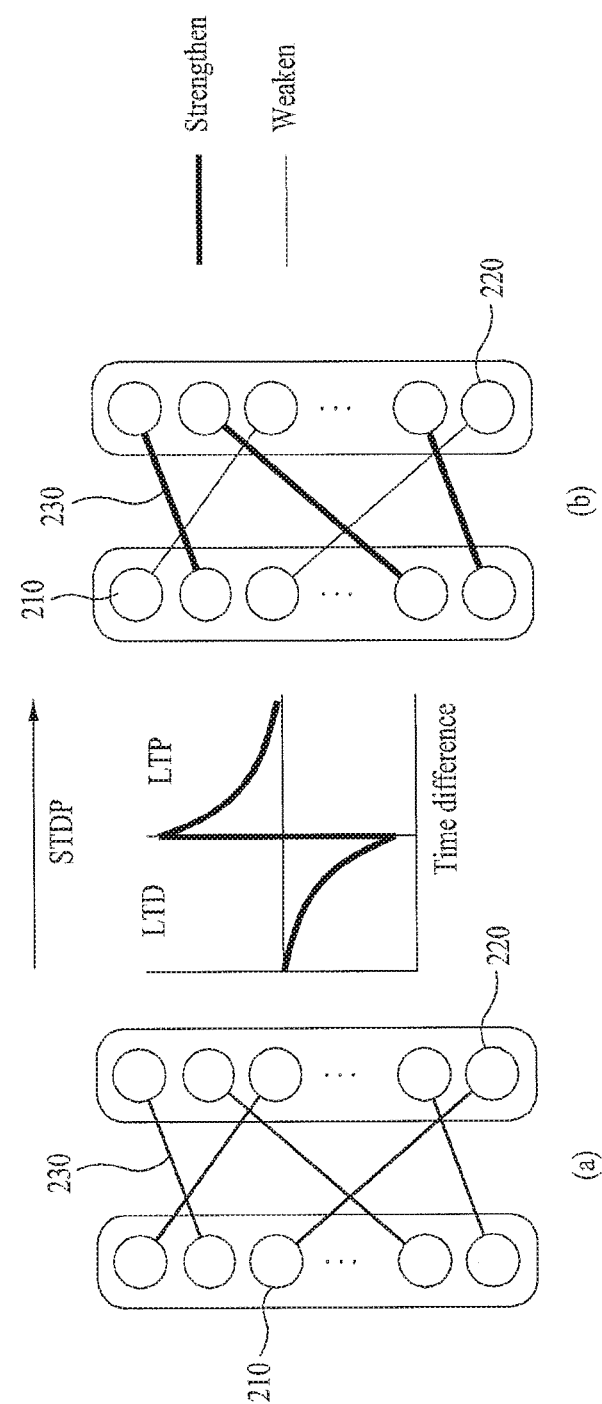
Figure 8:
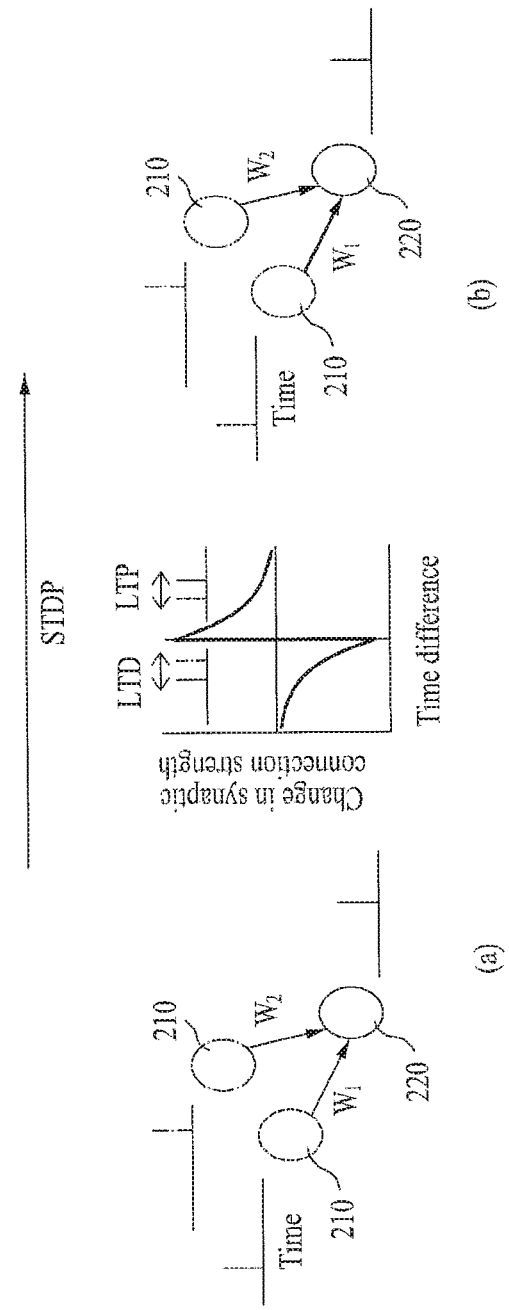

FIG. 5 is a flowchart illustrating an example of an operating method of the storage device 100 according to at least example embodiment, and FIGS. 6, 7, and 8 illustrate examples of an operation of learning detected information of FIG. 5 according to at least one example embodiment.

Referring to FIG. 5, in operation 510, the storage device 100 may detect input information. The processor 130 may detect the input information through the interface 110.

In operation 520, the storage device 100 may learn the detected information. The processor 130 may learn the detected information using the neural network 200. Here, the storage device 100 may redistribute old information. The processor 130 may redistribute the old information, that is, information prestored in the memory 120 using the neural network 200. Here, the processor 130 may automatically redistribute the information prestored in the memory 120 based on an amount of the input information. For example, if an amount of the input information exceeds the storage capacity of the storage device 100, the processor 130 may redistribute information prestored in the memory 120.

According to example embodiments, the neural network 200 may include the plurality of input neurons 210, the plurality of output neurons 220, and the plurality of synapses 230 configured to connect the input neurons 210 and the output neurons 220, respectively. Here, the neural network 200 may be configured to realize the accuracy-storage capacity tradeoff. To this end, the synapses 230 may include at least one stable synapse 231 and at least one flexible synapse 233.

The processor 130 may adjust the synaptic strength of at least one of the synapses 230, while learning the detected information. Here, the synaptic strength may be determined as a single value between 0 and 1 and may be represented as a weight. Here, the processor 130 may adjust at least one of the synaptic strength of the stable synapse 231 and the synaptic strength of the flexible synapse 233. If the synaptic strength of the stable synapse 231 is less than a predetermined strength, the processor 130 may adjust the synaptic strength of the stable synapse 231 and the synaptic strength of the flexible synapse 233. Here, the processor 130 may strengthen, for example, increase the synaptic strength of the stable synapse 231 and may strengthen or weaken, for example, increase or decrease the synaptic strength of the flexible synapse 233. In contrast, if the synaptic strength of the stable synapse 231 is the predetermined strength, the processor 130 may maintain the synaptic strength of the stable synapse 231 and may adjust the synaptic strength of the flexible synapse 233. Here, the processor 130 may strengthen or weaken, for example, increase or decrease the synaptic strength of the flexible synapse 233.

According to an example embodiment, the neural network 200 may include a feedforward spiking neural network. In this case, referring to FIG. 6, the processor 130 may convert input information 600, for example, an image and a text, to one or more temporal patterns 601, 602, and 603 in a spike form, and may learn the temporal patterns 601, 602, and 603 using the feedforward spiking neural network. Here, referring to FIG. 7, the processor 130 may adjust the synaptic strength of at least one of the synapses 230 based on an STDP learning rule. When the synapses 230 connect the input neurons 210 and the output neurons 220, respectively, as shown in (a) of FIG. 7, the processor 130 may strengthen or weaken the synaptic strength of at least one of the synapses 230 as shown in (b) of FIG. 7.

For example, when the synapses 230 connect the input neurons 210 and the output neurons 220, respectively, as shown in (a) of FIG. 8, the processor 130 may adjust the synaptic strength of at least one of the synapses 230 based on a time difference between an input spike and an output spike as shown in (b) of FIG. 8. If an input spike is generated before an output spike ($\Delta t>0$), the processor 130 may strengthen, for example, increase the synaptic strength. If the output spike is generated before the input spike ($\Delta t<0$), the processor 130 may weaken, for example, decrease the synaptic strength.

In operation 530, the storage device 100 may store the learned information. The processor 130 may store the learned information in the memory 120.

An operating method of the storage device 100 according to example embodiments is configured to implement automatic redistribution of information and variable storage capacity based on accuracy-storage capacity tradeoff, and may include detecting input information, learning the detected information using the neural network 200, and storing the learned information.

According to example embodiments, the neural network 200 may include the plurality of input neurons 210, the plurality of output neurons 220, and at least one stable synapse 231 configured to connect at least one of the input neurons 210 and at least one output neurons 220, respectively, and at least one flexible synapse 233 configured to connect at least one remaining of the input neurons 210 and at least one remaining of the output neurons 220, respectively.

According to example embodiments, the learning may include redistributing old information using the neural network 200.

According to example embodiments, the redistributing may include redistributing the old information based on an amount of the detected information.

According to example embodiments, the learning may include adjusting at least one of the synaptic strength of the stable synapse 231 and the synaptic strength of the flexible synapse 233.

According to example embodiments, if the synaptic strength of the stable synapse 231 is a predetermined strength, the adjusting may include maintaining the synaptic strength of the stable synapse 231 and adjusting the synaptic strength of the flexible synapse 233.

According to example embodiments, if the synaptic strength of the stable synapse 231 is not reached to the predetermined maximum or minimum strength, the adjusting may further include adjusting the synaptic strength of the stable synapse 231 and the synaptic strength of the flexible synapse 233.

According to example embodiments, the neural network 200 may include a feedforward spiking neural network.

According to example embodiments, the learning may include converting the detected information to at least one temporal pattern in a spike form and learning a temporal pattern using the feedforward spiking neural network.

According to example embodiments, the adjusting may include adjusting at least one of the synaptic strength of the stable synapse 231 and the synaptic strength of the flexible synapse 233 based on an STDP learning rule.

According to example embodiments, the storage device 100 may efficiently use a storage capacity. That is, the storage device 100 may flexibly use the storage capacity without changing a physical structure. The storage device 100 may maintain prestored, that is, old information by redistributing and altering the old information using the neural network 200. Accordingly, the storage device 100 may maintain the old information and may learn the input information although an amount of the input information exceeds the storage capacity of the storage device 100. That is, the accuracy-storage capacity tradeoff may be realized in the storage device 100.

FIGS. 9, 10A, 10B, and 10C, 11, and 12A, B, and C illustrate examples of describing a performance of the storage device 100 according to example embodiments.

Figure 9:
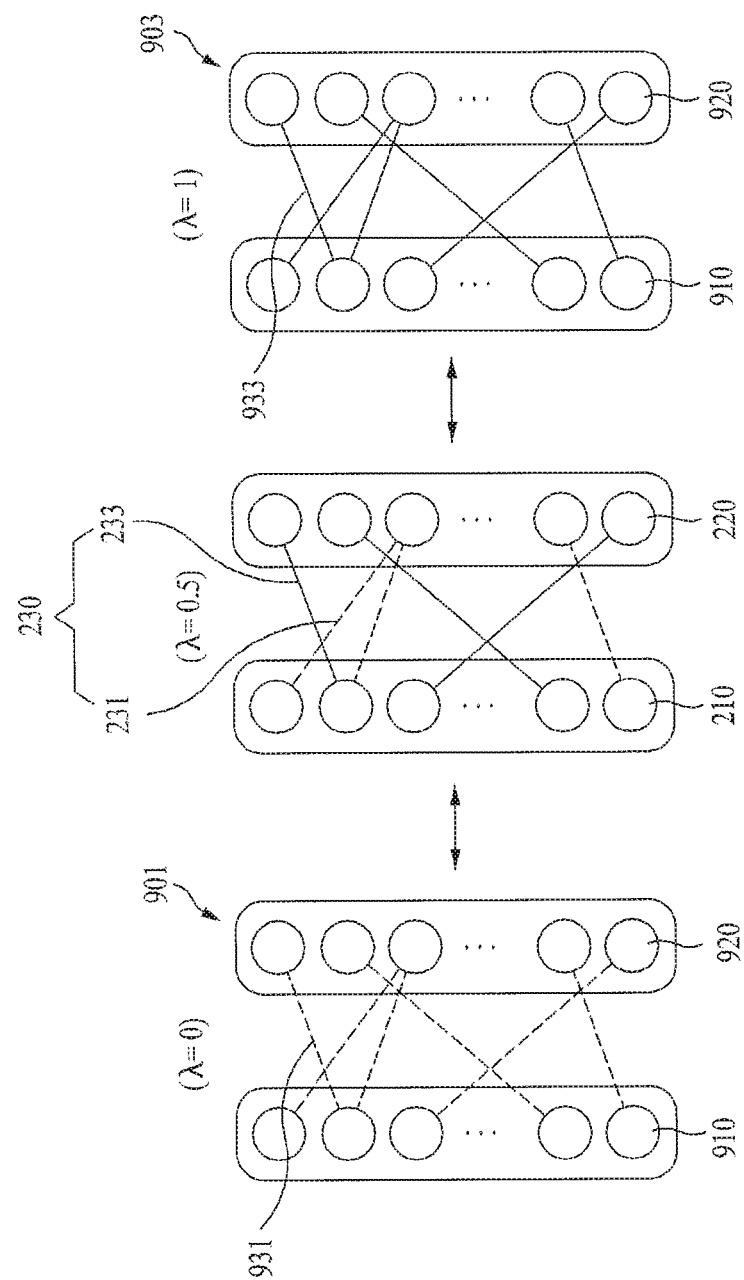
FIGS. 9, 10A, 10B, and 10C, 11, and 12A, B, and C illustrate examples of describing a performance of a storage device according to at least one example embodiment.

Referring to FIG. 9, the storage device 100 according to example embodiments may use the neural network 200. According to example embodiments, the neural network 200 may include the input neurons 210, the output neurons 220, and the synapses 230. The synapses 230 may include at least one stable synapse 231 and at least one flexible synapse 233. A ratio λ of the flexible synapse 233 among the synapses 230 may be determined as a value between 0 and 1.

Compared thereto, neural networks 901 and 903 according to general arts may be defined. The neural network 901 according to General art 1 may include input neurons 910, output neurons 920, and stable synapses 931. Here, the neural network 901 does not include a flexible synapse and thus, a ratio λ of flexible synapses may be 0. The neural network 903 according to General art 2 may include the input neurons 910, the output neurons 920, and flexible synapses 933. Here, the neural network 903 does not include a stable synapse and thus, a ratio λ of the flexible synapses 933 may be 1.

Here, a memory index representing the memory performance of each of the neural networks 200, 901, and 903 may be defined. The memory index may be detected by sequentially inputting a learned pattern into the neural networks 200, 901, and 903 and by measuring an output pattern. Here, the memory index may be defined as the following Equation 5. That is, to compare the memory performance of the neural networks 200, 901, and 903, the memory indices of the neural networks 200, 901, and 903 may be detected. For example, the memory indices of the neural networks 200, 901, and 903 may be detected by generating 6 temporal patterns with a predetermined length (e.g., 100 ms) in which all of the input neurons 210, 910 are fired randomly once and by sequentially inputting and learning the patterns into the neural networks 200, 901, and 903 a predetermined number of times (e.g., 50 times).

$$\text{Memory Index} = \frac{1}{N_{pair}} \sum_{i,j \in [1:20]} \frac{S_i \cdot S_j}{N_{firing}} \qquad \text{[Equation 5]}$$

In Equation 5, $S_i$ denotes an output pattern, and each of $N_{pair}$ and $N_{firing}$ denotes a constant for normalizing a memory index based on a total number of patterns and a number of spikes.

Figure 10A:
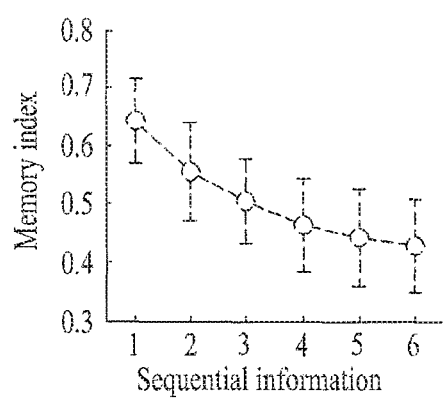
Figure 10B:
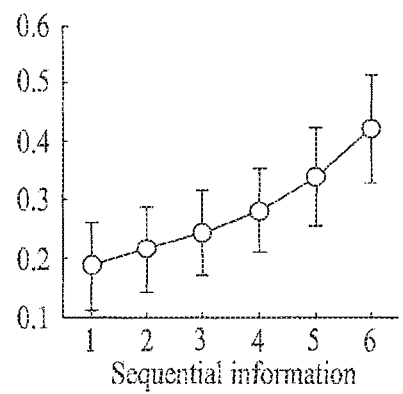
Figure 10C:
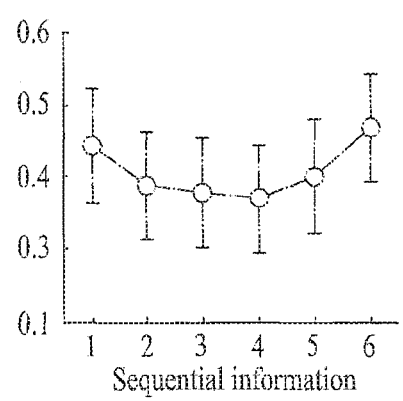
Figure 11:
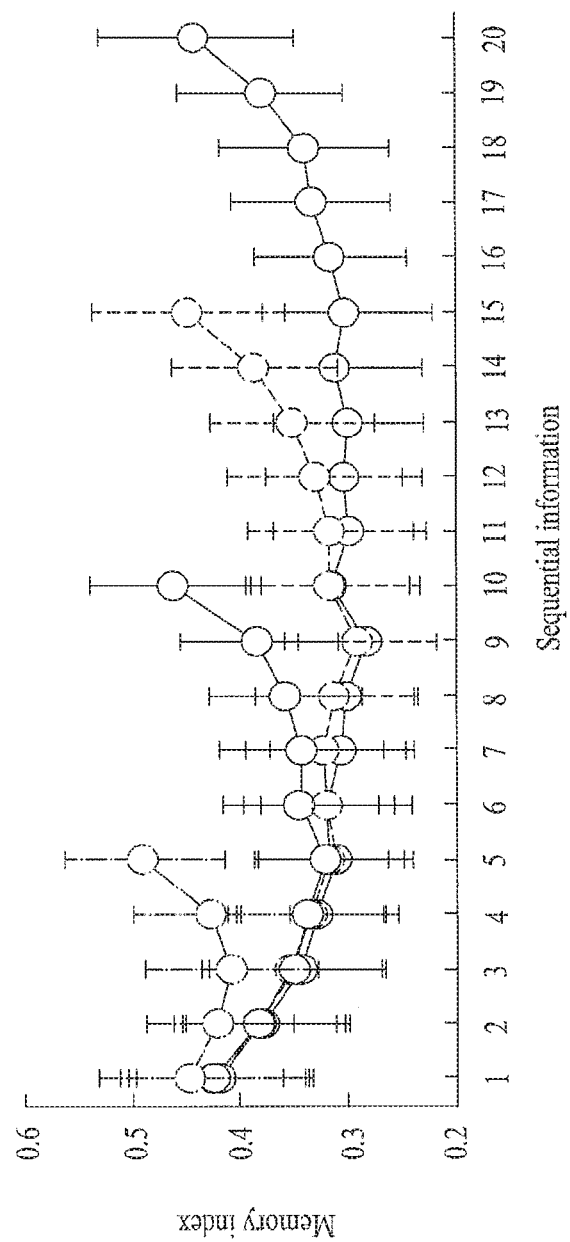

According to General art 1, the memory index of the neural network 901 may vary as shown in FIG. 10A. Referring to FIG. 10A, the performance of maintaining old information is strengthen, that is, increases and the performance of learning newly input information is weakened, that is, decreases. According to General art 2, the memory index of the neural network 903 may vary as shown in FIG. 10B. Referring to FIG. 10B, the performance of maintaining old information is weakened, that is, decreases and the performance of learning newly input information is strengthened, that is, increases. According to example embodiments, the memory index of the neural network 200 may vary as shown in FIG. 10C. Referring to FIG. 10C, the performance of maintaining old information and the performance of learning newly input information may be improved to be greater than or equal to a predetermined level. This aspect may appear alike regardless of an amount of information learned in the neural network 200, which is illustrated in FIG. 11. In addition, the accuracy of information stored according to each of General art 1, General art 2, and the example embodiments may be represented as a graph shown in FIG. 12A.

Figure 12A:
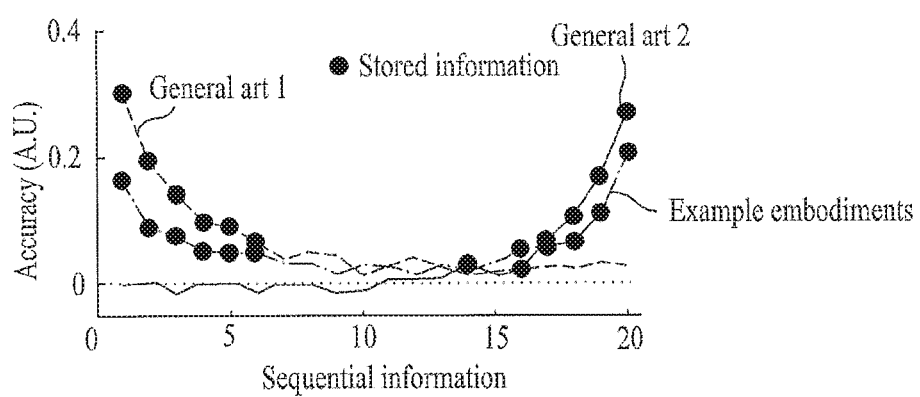
Figure 12B:
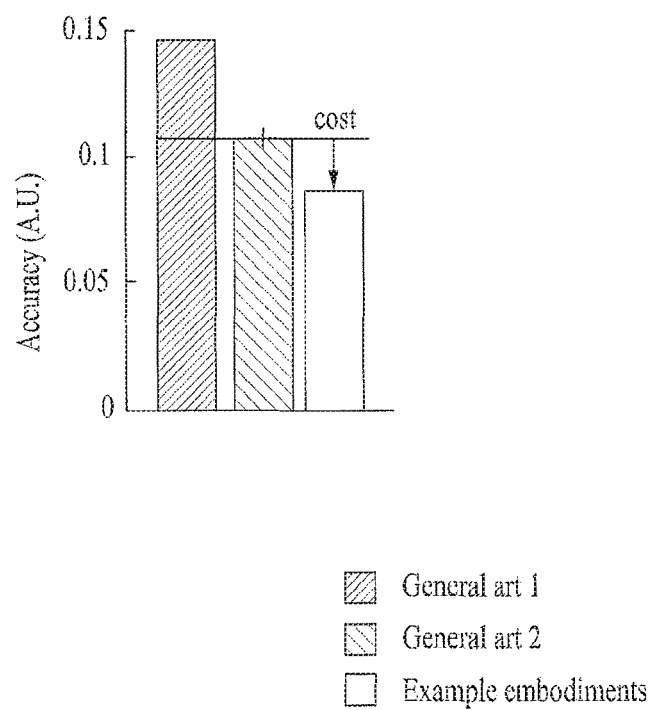
Figure 12C:
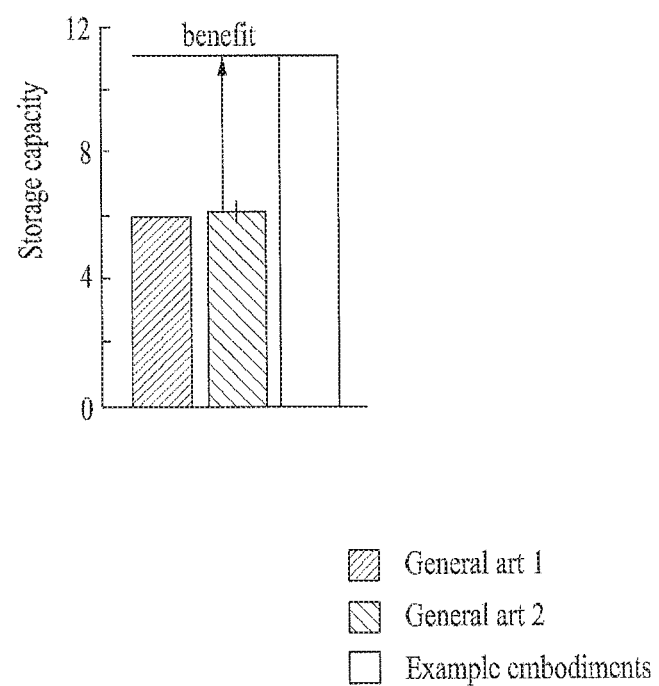

According to example embodiments, referring to FIG. 12A, the neural network 200 includes all of the stable synapses 231 and the flexible synapses 233 and thus, may maintain old information and may learn input information. To this end, the storage device 100 may maintain the old information by redistributing and altering the old information using the neural network 200. In addition, to additionally store the learned information, the storage device 100 may control the accuracy of the storage device 100 as shown in FIG. 12B to increase the storage capacity of the storage device 100 as shown in FIG. 12C. That is, the storage device 100 may realize accuracy-storage capacity tradeoff by redistributing the old information. Accordingly, the storage device 100 may flexibly use the storage capacity based on an amount of input information.

The example embodiments may apply to the overall industry and products using a neural network. Examples of technology using the neural network may include systems using the neural network as a key algorithm of information storage, such as an artificial intelligence (AI) customized secretary, cognitive computing, artificial vision, a wearable robot control, and the like. In this case, a consecutively learnable memory system needs to be equipped and thus, the methods proposed herein may apply importantly. Further, in the case of designing neuromorphic storage device hardware that copies the human brain, a learning rule and system according to the example embodiments may apply as is and may copy flexible memory characteristics of biological brain.

The example embodiments may specially appropriately apply to implement the AI that needs to be trained like a human. Due to characteristics of the AI that needs to be trained at all times like a human, such as, for example, an AI secretary and a pet robot, input data geometrically increases. Therefore, the AI may not be readily implemented using a method of memorizing all of the input data without appropriate oblivion. When it is difficult to add hardware due to a physical separation from an outside, such as an exploration robot or a nanobot that inserts into a body, only necessary information may be selectively stored by efficiently applying an algorithm according to the example embodiments.

The example embodiments and the terms used herein are not construed to limit the disclosure to specific example embodiments and may be understood to include various modifications, equivalents, and/or substitutions. Like reference numerals refer to like elements throughout although they are illustrated in different drawings. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "A or B", "at least one of A and/or B", "A, B or C", or "at least one of A, B and/or C," when preceding a list of elements, may include any and all of combinations of the list. Although the terms "first," "second," "third," etc., may be only used to distinguish one component from another component. When an (e.g., first) component is "(functionally or communicatively) connected to" or "coupled to" another (e.g., second) component, the component may be directly connected to the other component or may be connected to the other element through still another element (e.g., third element).

The term "module" used herein may include a unit including hardware, software, or firmware, and may be interchangeably used with the terms, logic, logic block, part, circuit, etc. The module may be an integrated part, a minimum entity of performing one or more functions, or a portion thereof. For example, the module may be configured as an application-specific integrated circuit (ASIC).

The example embodiments may be configured as software including at least one instruction stored in a storage medium, for example, the memory 120, readable by a machine, for example, the electronic device 100. For example, the processor 130, of the machine may call at least one of the stored instructions from the storage medium and may execute the called instruction. Accordingly, the machine may operate to perform at least one function in response to the called at least one instruction. Examples of such instructions may include machine code, such as produced by a compiler and a file containing a higher level code that may be executed by the computer using an interpreter. Here, the machine-readable storage medium may be provided in a form of a non-transitory machine-readable storage medium. Here, "non-transitory" merely indicates that the storage medium is a tangible device and does not include a signal (e.g., electromagnetic wave). This term does not distinguish a case in which data is semi-permanently stored in the storage medium from a case in which data is temporarily stored.

According to example embodiments, each component (e.g., module or program) of the aforementioned components may include a single object or a plurality of objects. According to example embodiments, at least one of the aforementioned components or at least one operation may be omitted. Alternatively, at least one component or at least one operation may be added. Alternatively or additionally, a plurality of components (e.g., module or program) may be integrated into a single component. In this case, the integrated component may perform at least one function of at least one of the plurality of components in the same or similar manner as performed by a corresponding component among the plurality of components. According to example embodiments, operations performed by a module, a program, or another component may be performed sequentially, in parallel, repetitively, or heuristically. Alternatively, at least one of the operations may be performed in different sequence or at least one operation may be added.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A storage device comprising:
a memory; and
a processor connected to the memory, and configured to learn input information using a neural network and to store the learned information in the memory,
wherein the neural network comprises:
a plurality of input neurons and a plurality of output neurons;
at least one stable synapse configured to connect at least one of the input neurons and at least one of the output neurons, respectively; and
at least one flexible synapse configured to connect at least one remaining of the input neurons and at least one remaining of the output neurons, respectively.

2. The storage device of claim 1, wherein the processor is configured to redistribute information prestored in the memory using the neural network while learning the input information.

3. The storage device of claim 2, wherein the processor is configured to automatically redistribute the pre-stored information based on an amount of the input information.

4. The storage device of claim 1, wherein the processor is configured to adjust at least one of a synaptic strength of the stable synapse and a synaptic strength of the flexible synapse while learning the input information.

5. The storage device of claim 4, wherein the processor is configured to maintain the synaptic strength of the stable synapse and to adjust the synaptic strength of the flexible synapse if the synaptic strength of the stable synapse is a predetermined strength.

6. The storage device of claim 5, wherein the processor is configured to adjust the synaptic strength of the stable synapse and the synaptic strength of the flexible synapse if the synaptic strength of the stable synapse is not reached to the predetermined strength.

7. The storage device of claim 4, wherein the neural network comprises a feedforward spiking neural network.

8. The storage device of claim 7, wherein the processor is configured to convert the input information to at least one temporal pattern in a spike form, and to learn the temporal pattern using the feedforward spiking neural network.

9. The storage device of claim 7, wherein the processor is configured to adjust at least one of the synaptic strength of the stable synapse and the synaptic strength of the flexible synapse based on a spike timing dependent plasticity (STDP) learning rule.

10. An operating method of a storage device, the method comprising:
detecting input information;
learning the detected information using a neural network; and
storing the learned information,
wherein the neural network comprises:
a plurality of input neurons and a plurality of output neurons;
at least one stable synapse configured to connect at least one of the input neurons and at least one of the output neurons, respectively; and
at least one flexible synapse configured to connect at least one remaining the input neurons and at least one remaining of the output neurons, respectively.

11. The method of claim 10, wherein the learning comprises redistributing prestored information using the neural network.

12. The method of claim 11, wherein the redistributing comprises redistributing the prestored information based on an amount of the detected information.

13. The method of claim 10, wherein the learning comprises adjusting at least one of a synaptic strength of the stable synapse and a synaptic strength of the flexible synapse.

14. The method of claim 13, wherein the adjusting comprises:
maintaining the synaptic strength of the stable synapse and adjusting the synaptic strength of the flexible synapse if the synaptic strength of the stable synapse is a predetermined strength.

15. The method of claim 14, wherein the adjusting further comprises:
adjusting the synaptic strength of the stable synapse and the synaptic strength of the flexible synapse if the synaptic strength of the stable synapse is not reached to the predetermined strength.

16. The method of claim 13, wherein the neural network comprises a feedforward spiking neural network.

17. The method of claim 16, wherein the learning comprises:
converting the detected information to at least one temporal pattern in a spike form; and
learning the temporal pattern using the feedforward spiking neural network.

18. The method of claim 16, wherein the adjusting comprises:
adjusting at least one of the synaptic strength of the stable synapse and the synaptic strength of the flexible synapse based on a spike timing dependent plasticity (STDP) learning rule.

19. A storage device storing one or more programs to implement an operation of detecting input information, an operation of learning the detected information using a neural network; and an operation of storing the learned information, wherein the neural network comprises:
a plurality of input neurons and a plurality of output neurons;
at least one stable synapse configured to connect at least one of the input neurons and at least one of the output neurons, respectively; and
at least one flexible synapse configured to connect at least one remaining of the input neurons and at least one remaining of the output neurons, respectively.

20. The storage device of claim 19, wherein the operation of learning comprises an operation of redistributing prestored information using the neural network.

* * * * *